37-337 CROSS REFERENCE SEARCH ROOM

BEST AVAILABLE COPY

May 4, 1948. C. G. KRONMILLER Re. 22,998

CONTROL DEVICE

Original Filed Dec. 4, 1942 3 Sheets-Sheet 1

Inventor
CARL G. KRONMILLER

By

George H. Fisher
Attorney

BEST AVAILABLE COPY

CONTROL DEVICE

Original Filed Dec. 4, 1942 3 Sheets-Sheet 2

Inventor
CARL G. KRONMILLER

George H. Fisher
Attorney

BEST AVAILABLE COPY

May 4, 1948. C. G. KRONMILLER Re. 22,998

CONTROL DEVICE

Original Filed Dec. 4, 1942 3 Sheets-Sheet 3

INVENTOR.
CARL G. KRONMILLER

BY

George H. Fisher
ATTORNEY

Reissued May 4, 1948

BEST AVAILABLE COPY

Re. 22,998

UNITED STATES PATENT OFFICE 22,998

CONTROL DEVICE

Carl G. Kronmiller, Edina, Minn., assignor to Minneapolis-Honeywell Regulator Company, Minneapolis, Minn., a corporation of Delaware Original No. 2,394,920, dated February 12, 1946, Serial No. 467,862, December 4, 1942. Application for reissue July 5, 1946, Serial No. 681,442

20 Claims. (Cl. 200—139)

My invention relates to condition responsive switches and more particularly to a switch responsive to variations in temperature adapted among other uses for room temperature control.

Another object of my invention is to provide a novel compact temperature responsive control mechanism for mounting within a circular convex shaped switch housing.

Another object of my invention is to provide a pair of thermally responsive bimetallic strips mounted on a pivotal member and arranged so as to jointly control the actuation of a switch member and thus permitting the compact mounting of a thermally responsive mechanism within a circular shaped housing without sacrificing efficiency of operation.

Another object of my invention is to provide a novel cam arrangement for adjustably positioning one of the thermally responsive strips so as to cause in turn the adjustment of the other of the said strips with respect to the switch member so as to regulate the thermal condition value at which said switch may be actuated.

Another object of my invention is to provide a novel switch blade structure including a resilient switch blade so constructed as to perform the double function of biasing the said pivotally mounted thermal responsive bimetallic strips in a direction so as to cause the cam actuated bimetallic strip to operatively engage said cam while serving as a novel push-back resilient contacting means.

Another object is to provide a thermally responsive bimetallic strip actuating means and switch contacts actuated thereby mounted separately and apart from the bimetallic strip so as to provide practically no metallic connections between the contacts and the bimetallic strip actuating means for the better alignment of the contacts.

Another object of my invention is to provide novel compact auxiliary heating mechanism positioned within the concave interior of the convex housing so as to affect equally the pair of bimetallic elements and the said heater controlled by the said switching mechanism in such a manner as to anticipate the arrival of a heating medium called for by the thermally responsive mechanism.

Another object of the invention is the provision of a novel heat damper and deflector mounted upon the heater in such a manner as to better regulate the flow of heat to the thermally responsive element so as to more accurately anticipate the arrival of the heating medium called for by the thermally responsive mechanism.

A further object of my invention is to provide a rotatable adjustment means mounted at the apex of the convex shaped switch housing and positioned flush with the surface thereof providing a convenient means for adjustment of the said cam for regulating the thermal condition value at which said switch may be actuated.

Another object of my invention is to provide a novel adjustment ring mounted within the convex surface of the housing in combination with mechanical means for regulating the condition value at which said thermally responsive switch mechanism may be actuated.

Condition responsive switch mechanisms provided for mounting within the home and heretofore known in the prior art have invariably included numerous projecting parts and sharp edges which have constituted a certain hazard in the home particularly where there may be children who might while in playing strike against such sharp edges to their injury. It has therefore been an object of my invention to provide a unitary condition responsive mechanism mounted within a circular shaped convex housing and including manually operable means mounted within the surface of the housing for the convenient finger tip adjustment of the condition value at which said mechanism may be actuated, and such housing and adjustment means having substantially no projecting parts or sharp edges so as thereby to provide a safe construction for mounting within the home.

Other objects and advantages of this invention are set forth in the following description, taken with the accompanying drawings, and the novel features thereof are pointed out in the appended claims. The disclosure, however, is illustrative only and I may make changes in details, especially in matters of shape, size, and arrangements of parts within the principles of the invention, to the full extent indicated by the broad general meaning of the terms in which the appended claims are expressed.

In the accompanying drawings, wherein like reference characters indicate corresponding parts in the various figures.

BEST AVAILABLE COPY

Figure 3:
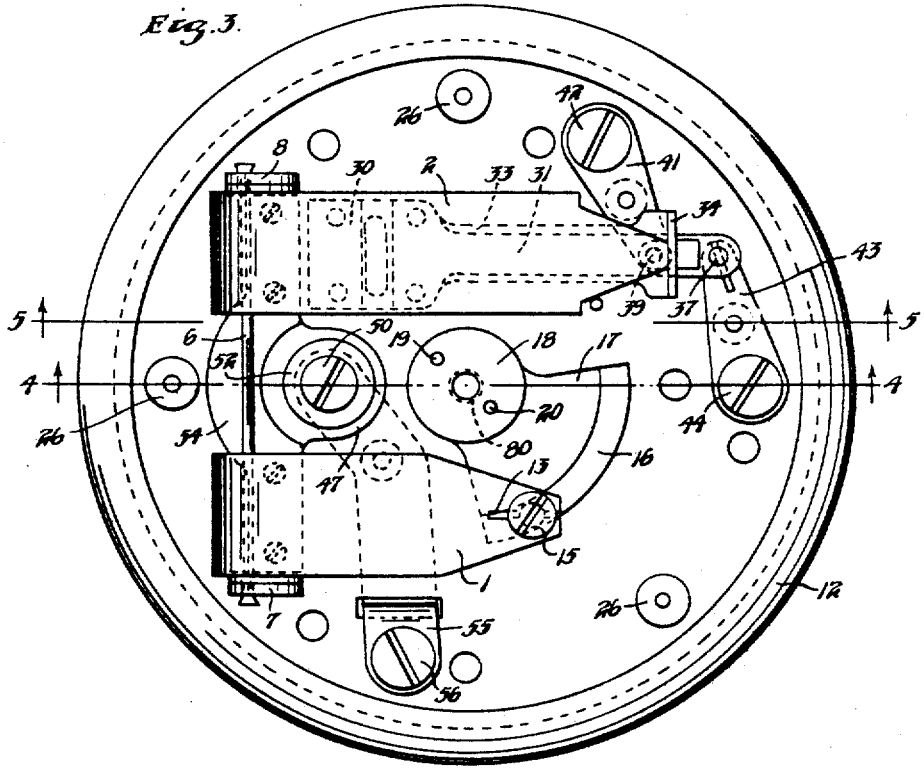
Figure 3 is an enlarged top plan view of the control mechanism with the cover of Figure 1 removed.
Figure 4:
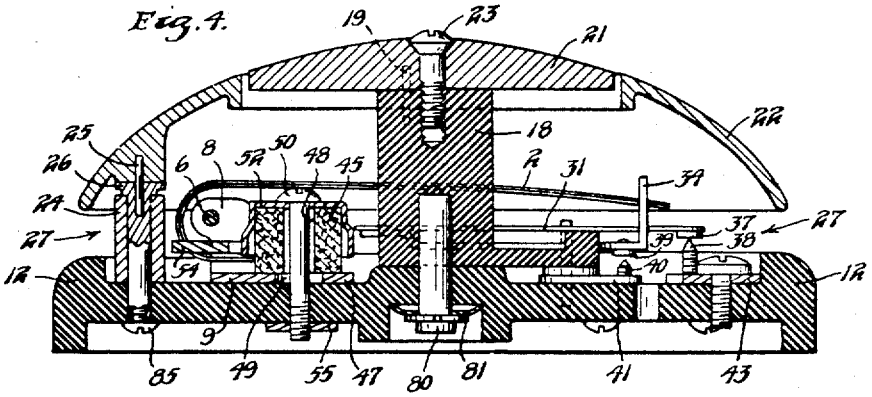
Figure 5:
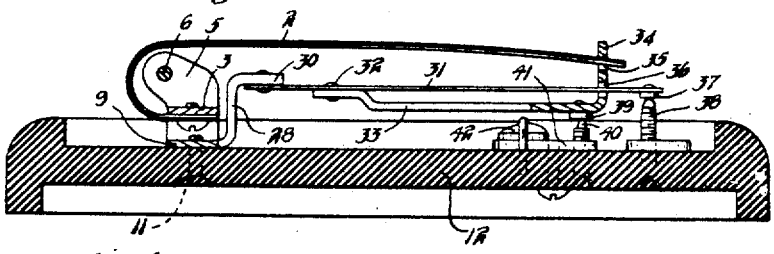
Figure 6:
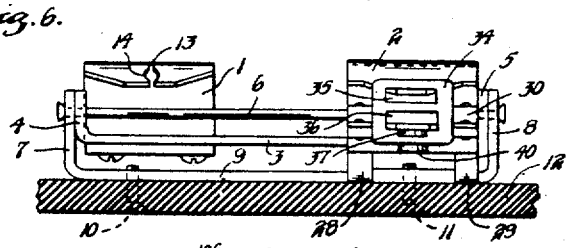

Figure 4 is a sectional view taken along the lines 4—4 of Figure 3 with the cover in place and looking in the direction of the arrows;

Figure 5 is a sectional view taken along the lines 5—5 of Figure 3 and looking in the direction of the arrows and with a portion of the switch actuating arm broken away in order to better illustrate the operation thereof;

Figure 6 is an end view of the thermostatic control mechanism which for clarity is shown separately from the remaining parts of the device.

Figure 2:
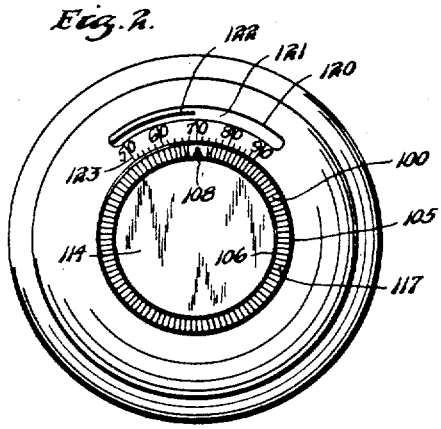
Figure 2 is a top plan view of a modified form of cover for housing my control mechanism.
Figure 7:
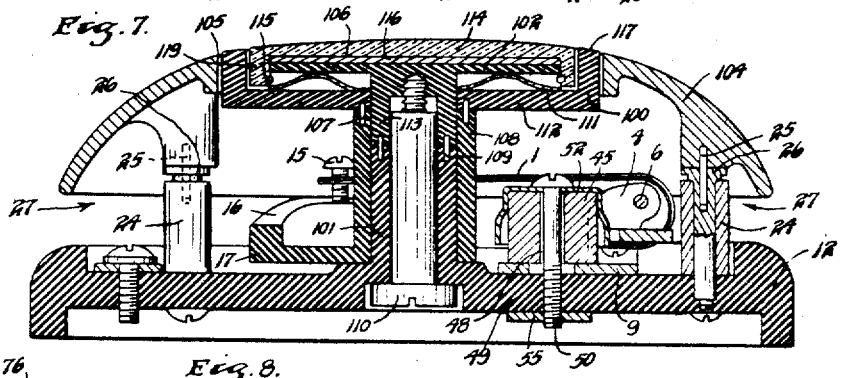
Figure 8:
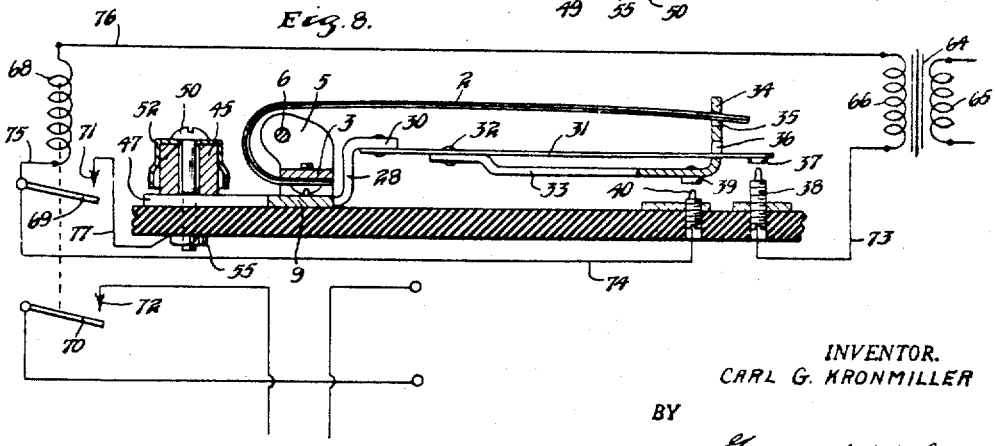

Figure 7 is an enlarged central sectional view of the modified form of my invention shown in Figure 2 but looking at the thermostatic control mechanism in the opposite direction from that shown at Figure 4, and Figure 8 is a schematic view of a control circuit embodying the control switch mechanism of my invention.

Referring now to the drawings, particularly Figures 3, 4 and 5, the switch actuating mechanism is shown as comprisng a pair of U-shaped bimetallic elements or members 1 and 2, which are affixed to a bracket member 3. At opposite ends of the bracket member 3 as shown in Figure 6 are projecting ears 4 and 5 which are pivotally connected by rod 6 to correspondingy projecting ears 7 and 8 of a fixed bracket 9. The fixed bracket 9 is fastened by bolts 10 and 11 to a base member 12 formed of suitable insulating material.

At an end of the bimetallic member 1 there is provided a slot 13 within which is formed a screw-threaded aperture 14 for engagement with an adjustment screw 15. An end of the adjustment screw 15 rides along the cam surface 16 of an adjustable cam member 17. The cam surface 16 is inclined so as to adjustably pivot the bimetallic member 1 and accordingly the bimetallic member 2 on the rod 6. Adjustable screw 15 is held in engaging relation against the inclined surface of cam 17 under a biasing force which will be explained.

The bimetallic members 1 and 2 are arranged so that the high expansion portion of the member 1 is reversed with respect to the high expansion portion of the member 2. Thus in Figure 3 the high expansion side of the bimetallic member 1 is the upper side while the high expansion side of the bimetallic member 2 is the under side. Therefore upon an increase in temperature the bimetallic member 1 having the free end thereof fixed as explained by the cam surface 16, will rotatably move the bracket 3 in a counterclockwise direction as viewed in Figure 4, in response to such increase in temperature and thereby move the bimetallic member 2 so as to cause the free end thereof to separate the contacts of a switch mechanism as will be explained later. Further since the under side of the bimetallic member 2 is the high expansion side as the bimetallic member 2 warps due to an increase in temperature it will also move its free end in a direction so as to separate the contacts of the said switch mechanism. It will be readily seen that the effects of these two bimetallic members are cumulative and the total movement of the free end of the bimetallic member 2 is substantially the same as if a single bimetallic member were used of a length equal to the sum of the lengths of the two U-shaped bimetallic members 1 and 2. It will be readily apparent, moreover, that by arranging the pair of bimetallic members as described and forming the members in a U-shape the same may be conveniently confined in a very limited space while retaining the substantial operative effectiveness of a single bimetallic strip of length equal to the sum of the lengths of the two members.

As shown in Figures 3 and 4, there is fixedly mounted on the cam 17 a shaft 18 connected through the tongue members 19 and 20 to an adjustable disk like member 21. The outer surface of adjustable disk 21 is convexed and substantially flush with a convexed outer housing casing 22. As shown in Figure 4, the adjustable disk 21 is positioned within an annular aperture formed at the apex of housing 22 and cam 17 may be conveniently adjusted by the rotation of disk 21. The disk 21 may be further fastened to the shaft 18 by a screw 23. A rotatable pin 80 projects through a suitable aperture positioned in the base member 12 at a point concentric therewith. One end of the pin 80 is affixed to the cam 17 and shaft 18 at a point concentric with the shaft 18 while the opposite end of the pin 80 is rotatably affixed at the under-side of the base member 12 by a suitable fastening washer 81.

The circular convex housing 22 is further spaced apart from and affixed to the base 12 by the posts 24. As shown in Figure 4 pins 25 project from the housing 22 for releasable engagement with suitable socket portions 26 mounted in the posts 24, whereby the housing 22 may be conveniently removed for repair or adjustment of the control mechanism mounted on the base 12. The posts 24 and socket portions 26 are fastened to the base 12 by the screws 85 which screw threadedly engage the socket portions 26 at the under side of the base 12. The space 27 separating the base member 12 from the casing 22 provides for a ready and efficient circulation of air around and adjacent to bimetallic members 1 and 2 so as to provide for their more efficient response to the temperature thereof.

Further projecting from the bracket 9 at a point adjacent to the bimetallic member 2 are switch supporting arms 28 and 29. The arms 28 and 29 are connected by a flanged portion 30 to which is riveted the resilient spring blade 31. Intermediate the opposite ends of the resilient spring blade 31 there is riveted at 32 an arm 33. The arm 33 is bent so as to extend substantially parallel to and at the opposite side of the resilient spring blade 31 from the bimetallic member 2. At one end of the arm 33 there is provided a plate member 34 extending at an angle to arm 33 and positioned across spring blade 31 and the bimetallic member 2. The plate 34 is suitably apertured at 35 and 36 so that the bimetallic member 2 and the spring blade member 31 may conveniently project through the respective apertures and are operatively engaged by inner edges of the said apertures.

As shown in Figures 4, 5 and 8 there is mounted at the free end of the spring blade switch member 31 a contact member 37 for cooperation with a contacting screw member 38. A contact member 39 is further mounted on the arm 33 for cooperation with a switch contact screw 40. The switch contact screw 40 is suitably connected by a strap 41 to terminal 42, while the screw contact 38 is suitably connected by electrical conductor strap 43 to terminal 44.

Positioned intermediate the two bimetallic members 1 and 2 is a heating member 45, best shown in detail in Figure 4. Such heating element is preferably formed of a suitable carbon cylinder having powdered copper sprayed at the opposite ends for contact purposes. One end of

BEST AVAILABLE COPY the carbon heater 45 engages a portion 47 which projects from the bracket 9 which serves as an electrical conductor to one terminal of the carbon heater 45. The carbon heater 45 has further extending substantially through the center thereof an aperture 48. A corresponding aperture 49 is similarly positioned in the contacting portion 47. Extending through said openings 48 and 49 and spaced apart from the aperture defining edges thereof is the bolt 50 which serves as a conductor of electrical energy to the opposite terminal of the carbon heater 45. Engaging in electrical conducting relation with the said other terminal of the carbon heater 45 and the conductor 50 is a shield like dampening member 52 which engages the carbon heater 45 at said other contact end but extends around and is spaced apart from substantially the remaining portion thereof. In operation, it will thus be seen that upon the conductors 47 and 50 becoming energized current will pass through the conductor 50, dampener 52 to one terminal of the carbon heater 45 and then through the carbon heater 45 to the opposite terminal of the heater 45 from where it will return to the source of electrical energy through the conductor 47. As shown in Figure 3, the bracket 3 is suitably bowed at 54 to avoid contacting the surrounding dampener or shield 52 of the heater 45. Further, as shown in Figure 3, the strap 55 serves as a suitable conductor from the bolt 50 to terminal 56.

In the operation of the foregoing mechanism, the resilient switch blade 31 not only serves as a resilient push-back switch contacting means but the same exerts a biasing force upon the arm 33 which through the engaging plate 34 biases the bimetallic member 2 and accordingly the bimetallic member 1 in a clockwise direction about the pivotal rod 3 as viewed in Figure 4 and thus causing the adjustment screw 15 of the bimetallic member 1 to engage the inclined surface 16 of the cam 17. Thus, under the biasing force of the resilient spring blade member 31, the adjustable screw 15 in normal operation is held at all times in engaging relation with the inclined surface of the cam 17. The temperature at which the switch mechanism will be actuated of course depends upon the adjusted position of the inclined surface 16 with respect to the adjustment screw 15.

The portion of the spring blade 31 between the flanged portion 30 and the point of attachment of the arm 33 thereto is relatively stiff, due to its short length, compared to the longer portion of the blade 31 carrying the contact 37. The flanged portion 30 supports the blade 31 in a position to bias the arm 33 to the position shown in Figure 5 in which contact 39 engages contact 40 and in which engagement of the contacts 37 and 38 bends the blade 31 away from the arm 33 at the aperture 36. On an increase in temperature the bimetallic elements 1 and 2, through their reaction against the cam surface 16, will act to raise the arm 33, first to separate the contacts 39—40, and on further increase in temperature to separate the contacts 37—38 by reason of the arm 33 engaging the blade 31 at the aperture 36.

In Figure 8 there is shown a wire diagram of a circuit employing the thermally responsive switch mechanism of my present invention. A step-down transformer 64 is used to supply low voltage current to the circuit. The transformer comprises a line voltage primary 65 and a low voltage secondary 66. One end of this secondary is connected to contact 38 and the other end thereof is connected to one terminal of a relay coil 68. This relay coil is associated with switch arms 69 and 70 which are adapted to engage with contacts 71 and 72, respectively, upon energization of said coil. Switch arm 70 and contact 72 control the operation of the temperature varying means; thus the contact arm and contact may control the operation of an oil burner motor, a gas valve or some similar device. Contact 71 is connected to the heater 45 through the terminal 56, as previously described, and the heater is in turn connected to the resilient spring blade switch arm 31 and arm 33 through the portion 47 of the bracket 9. Contacts 37 and 38, as previously described, are less widely spaced than contacts 39 and 40 so that upon a decrease in temperature contacts 37 and 38 are first brought into engagement upon the clockwise movement of the bimetallic member 2, previously described. The bimetallic elements 1 and 2 are adapted to cooperate so as to move the switch arms 31 and 33 in the direction of contacts 38 and 40 upon a fall in temperature. Upon such a fall in temperature taking place, contacts 37 and 38 are first brought into engagement. The engagement of these contacts alone does not establish any circuit. On further reduction in temperature the bias supplied by the portion of the blade 31 between the flanged portion 30 and the point of attachment of the arm 33 thereto will move the arm 33 to cause engagement of the contacts 39 and 40. The flexible portion of the blade 31 carrying the contact 37 will be pressed back by contact 37 engaging the stationary contact 38, causing disengagement of the blade 31 from the arm 33 at the aperture 36.

Upon engagement of contacts 39 and 40, the following energizing circuit is established: from secondary 66 through conductor 73, contacts 38 and 37, switch arms 31 and 33, contacts 39 and 40, conductor 74, conductor 75, relay coil 68, and conductor 76 back to the secondary 66. The establishment of this energizing circuit results in relay coil 68 being energized and causing the engagement of contact arms 69 and 70 with contacts 71 and 72, respectively. The engagement of switch arm 70 with contact 72 completes the circuit of the temperature varying means. The engagement of contact arm 69 with contact 71 establishes a holding circuit for relay coil 68. This holding circuit is as follows: from secondary 66 through conductor 73, contacts 38 and 37, switch arm 31, bracket 9, heater 45, cap 52, screw 50, member 55, conductor 77, contact 71, and switch arm 69, conductor 75, relay coil 68, conductor 76, back to the secondary 66. Thus, so long as both contacts 38 and 37 and contacts 39 and 40 are in engagement there will be two pair of circuits through coil 68, one of these circuits including the heating element 45 and the other of these circuits being merely across the contact carrying portion of the switch mechanism. Since the former circuit is a much higher resistance because of the presence of the high resistance carbon heating element 45, very little current will flow through this circuit. As the temperature of the space to be heated rises due to the operation of the temperature varying means, the bimetallic members 1 and 2 will be gradually deflected in that direction tending to move contacts 39 and 37 away from contacts 40 and 38 respectively. After this connection has continued for a short time, contacts 39 and 40 which, as previously mentioned, are more widely spaced than contacts 37 and 38 will be moved out of engagement leaving contacts 37 and 38 still in engagement. If

BEST AVAILABLE COPY this takes place the only circuit through relay coil 66 is through the heater 45 so that greater electrical energy will now flow through the heater. This will cause the heating element 45 to raise the temperature adjacent the bimetallic elements 1 and 2 with the result that within a comparatively short period of time the bimetallic elements 1 and 2 will be deflected sufficiently in response to the increased temperature to overcome the biasing force of the spring member 31 sufficiently so that the disengagement of contacts 37 and 38 will finally be effected. It will be seen that the effect of the heater 45 is to accelerate the breaking of the contacts of the thermostatic switch after the temperature in the space has begun to rise by reason of the operation of the temperature varying means. By reason of the sequential engagement of contacts 37 and 38 and 39 and 40, a chattering action is avoided in that very slight movement of the bimetallic elements 1 and 2 will not put into operation the temperature varying means, nor after both pairs of contacts are in engagement will a slight temporary rise sufficient only to cause disengagement of contacts 39 and 40 momentarily, cause the temperature varying means to be put out of operation. However, when the rise in temperature is not merely a temporary one but is indicative of gradually rising temperature by reason of the operation of the temperature varying means, the heater 45 functions to cause a more rapid disengagement of the temperature responsive switch mechanism so as to lessen the danger of temperature rising above the optimum temperature.

If means such as described are not provided, it is quite common for the temperature to rise a number of degrees above the desired temperature after the temperature responsive control mechanism has put into operation the temperature varying means, due to the time lag between the projection of the heat in the furnace and the delivery of the same to the room or space to be heated.

Figure 1:
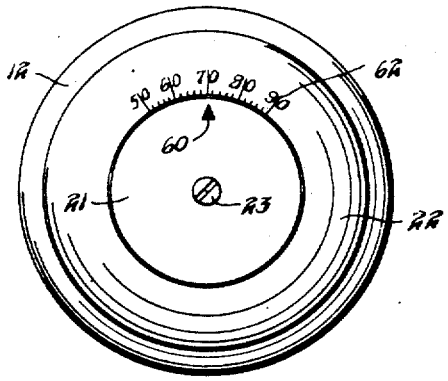
Figure 1 is a top plan view of my control mechanism cover.

Futhermore it will be seen that I have provided a novel compact housing for the temperature responsive mechanism, which mechanism may be mounted on the wall or the surface of the room to be heated. Further, as shown in Figure 1 the temperature responsive mechanism may be readily adjusted for the condition value at which the temperature varying means is to be operated by the simple adjustment of the disk 21. A pointer 60 is mounted on the disk 21 for cooperation with suitable indications 62 provided on the casing 22 for indicating the desired temperature. In Figures 2 and 7, there is shown a modified form of casing for my condition responsive mechanism. This form of my control mechanism differs structurally from the previously described form primarily in the arrangements of the manual adjustment means. Instead of the cam 17 being adjusted by the disk 21 through the shaft 18, I have provided in the modified form of my invention an adjustable annular member 100 for regulating the position of the cam 17. A fixed post 101 projects from the base 12 and has rotatably mounted thereon the cam 17.

A convex shaped circular casing 104 is provided mounted upon the base member 12 by posts 24. Pin members 25 are provided adapted to be disposed in suitable apertures formed in the socket portions 26 arranged as previously described so that the casing 104 may be conveniently removed for repairs and adjustments of the mechanism contained therein.

At the apex of the covering 104 an annular opening 105 is provided within which is disposed annular adjustment means 100 fastened by tongue members 107 in engaging relation with a rotatable shaft 108 projecting from the cam member 17 and surrounding the fixed shaft 101.

An annular recess 106 is formed within the member 100 for receiving a fixed disk like member 102 having a fixed shaft 113 projecting through a suitable aperture formed in the member 100. The shaft 113 is fastened by tongue members 109 to the post 101 fixedly mounted on the base member 12. The shaft 113 and the fixed member 101 are further secured together by fastening bolt 110.

A cap like member 114 formed of Lucite or other suitable transparent plastic material is placed over the disk 102. The cap like member 114 has provided a projecting annular flange 119 separating the annular edge of the disk 102 from the corresponding inner annular edge of the member 100. A split spring ring 115 positioned within a suitable annular groove formed at the inner edge of the flange 119 secures the transparent cap 114 on the disc member 102. A monogram card or other suitable identification means 116 may be placed between the disk 102 and the transparent cap 114 so as to show through the transparent cap 114 as shown in Figure 7.

A leaf spring 111 is disposed between the bottom of the disk 102 and an edge 112 defining the bottom of the annular recess 106 of the adjustment member 100 within which the disk 102 is disposed. The said leaf spring 111 is arranged so as to bias the annular member 100 toward the base 12 and serves as a slip friction arrangement whereby the adjustment member 100 may be held in adjusted position.

The outer annular edge of the adjustment member 100 is knurled at 117 whereby the same may be conveniently adjusted with the finger tips causing thereby a corresponding adjustment of the cam 17 and accordingly adjusting the control mechanism as previously explained. An indicator mark 118 is provided on the knurled edge 117 for cooperation with suitable scale markings 123 provided on the casing 104 for indicating the condition value at which the temperature varying means is to be operated by the control mechanism.

As shown in Figure 2 there is further provided in the casing 104 a semicircular slot 120 behind which is fastened by suitable means a semicircular thermometer tube 121 preferably of the mercury type having an indicator line 122 which is arranged to show through the slot 120 and cooperate with the said scale markings 123 so as to indicate the temperature of the air adjacent thereto.

It will be seen from the foregoing that there has been provided a condition responsive control mechanism of very compact structure and arrangement, in which there is included a pair of U-shaped bimetallic members so arranged that the same may be confined in a very limited space while the totality of the effect thereof in accuracy and efficiency is equal to that of a single bimetallic strip having a length equal to the sum of the lengths of the pair of U-shaped bimetallic members. Moreover there is provided a novel casing of a hemispherical shape for housing this compact structure, including a novel finger tip adjustment means. Such casing further pro-

BEST AVAILABLE COPY vides an annular opening surrounding the condition responsive mechanism and immediately adjacent thereto for the better circulation of the surrounding medium so as to cause the immediate response of such mechanism to condition variation. Further, I have provided a novel switch mechanism in which a resilient blade combines the functions of a resilient support for a relatively rigid contact actuating arm and as a resilient contact pressback blade.

I have further provided within the said housing a compact novel heater arrangement having great efficiency in comparison to its size for anticipating the arrival of the condition varying medium called for by the condition responsive switch mechanism.

While two specific embodiments of this invention have been described, it will be understood that these are for the purpose of illustration only, and that the invention is to be limited only by the scope of the appended claims.

I claim as my invention:

1. A device of the character described comprising, in combination, a base, temperature responsive means mounted on said base, switch means controlled by said temperature responsive means, a circular cover of convexed shape surrounding said temperature responsive means and said switch means, supporting means for mounting said cover on said base in spaced relation to said base whereby there is provided an opening surrounding said temperature responsive means so that air may circulate through said opening directly adjacent to said temperature responsive means, a disk mounted substantially at the apex of said cover and forming a part of said cover, said disk affixed to said base, a ring like member surrounding said disk and manually adjustable for regulating the temperature condition at which said temperature responsive means may control said switch means.

2. A thermostatic switch comprising, in combination, a base, a bracket affixed to said base, a pair of bimetallic elements, said elements connected at one end, and said connected elements pivotally mounted on said bracket, said elements being positioned side by side in spaced relation and extending laterally from said pivotal mounting, control means operated by the other end of one of said pair of elements, a rotatable cam positioned within the space separating the said elements and having the axis thereof extending transverse to the axis of the pivotal mounting of said elements, said cam operably engaging the other end of the second of said pair of elements in order to adjust the temperature value at which said thermostat is set.

3. A thermostatic switch comprising, in combination, a base, a bracket affixed to said base, a member pivotally mounted on said bracket, a pair of U-shaped bimetallic elements, each element attached at one end to said member, said elements being positioned side by side in spaced relation and extending laterally therefrom, control means operated by the other end of one of said pair of elements, a cam rotatably mounted intermediate the said pair of U-shaped bimetallic elements and arranged for moving the other end of the second of said pair of elements in order to adjust the temperature value at which said thermostat is set.

4. A thermostatic switch comprising, in combination, a base, a bracket affixed to said base, a member pivotally mounted on said bracket, a pair of U-shaped bimetallic elements, each element attached at one end to said member, said elements being positioned side by side in spaced relation and extending laterally therefrom, a fixed contact, a spring blade biasing said member for rotation about said pivot and the spring blade operated by the other end of one of said pair of elements for cooperating with said fixed contact for controlling an electrical circuit, a cam rotatably mounted between said pair of U-shaped bimetallic elements and arranged so as to engage the other end of the second of said pair of elements so as to adjustably limit the rotation of said member in response to the biasing force of said spring blade, and said cam arranged so as to adjustably position said spring blade in relation to said fixed contact in order to adjust the temperature value at which said thermostat is set.

5. A thermostatic switch comprising, in combination, a base, a bracket affixed to said base, a member pivotally mounted on said bracket, a pair of bimetallic elements, each element attached at one end to said member, said elements being positioned side by side in spaced relation and extending laterally therefrom, control means operated by the other end of one of said pairs of elements, adjusting means cooperating with the other end of the second of said pair of elements, an auxiliary heat producing means positioned within the space separating the pair of elements and said auxiliary heat producing means substantially equally distanced from said elements so that the heat produced thereby may substantially equally affect said elements, and said auxiliary heat producing means regulated by said control means.

6. A thermostatic control for regulating the heating medium supplied from a main source, comprising, in combination, a temperature responsive means, control means operated by said temperature responsive means, a cylindrical carbon block having an aperture formed therein and extending therethrough, a first electrical conductor engaging said block at one end, a second electrical conductor extending through said aperture in spaced relation to the interior aperture defining wall of said block and said first conductor, a cylindrical cap like member mounted upon the other end of said cylindrical carbon block and electrically connecting said second conductor and said other end of said carbon block, said cap like member surrounding in spaced relation a portion of the cylindrical outer wall of said block, said conductors connected in an electrical circuit for energizing said carbon block for the production of an auxiliary supply of heating medium, said cap like member regulating the radiation of said heating medium, and said electrical circuit controlled by said control means, whereby upon a predetermined rise in temperature said carbonaceous block will be electrically energized so to cause the production of said auxiliary supply of heat for effecting said temperature responsive means in such a manner as to anticipate the arrival of an additional supply of heating medium from said main source and causing said temperature responsive means to operate said control means for performing an additional control function.

7. A device of the character described, comprising, in combination, a base, a first bracket affixed to said base, a second bracket pivotally mounted on said first bracket, a pair of U-shaped bimetallic elements, each element attached at one end to said second bracket, said elements being positioned side by side and in spaced re-

BEST AVAILABLE COPY lation extending laterally therefrom, the high expansion portions of said elements being reversed with respect to each other, a first switch arm, a second spring blade switch arm, said second switch arm biasing said first switch arm into engaging relation with one of said bimetallic elements in such a manner as to bias said second bracket for rotation about said pivot, a first switch contact for engagement by said first switch arm and a second switch contact for engagement by said second switch arm, a cam having an inclined surface, said cam mounted on the base within the space separating the said pair of bimetallic elements and the inclined surface of said cam arranged for engaging the other end of the second of said pair of elements so as to adjustably limit the rotation of said second bracket in response to the biasing force of said second switch arm, and said inclined surface of said cam so arranged as to adjust said element so as to adjustably position said switch arms in relation to said switch contacts in order to adjust the temperature value at which said contacts may be engaged by said switch arms, an electric heater mounted on said first bracket and positioned between and spaced substantially an equal distance apart from each of said bimetallic members, and said electric heat controlled by said first and second switch arms whereby upon a predetermined rise in temperature said electric heater will be electrically energized so as to cause the production of an auxiliary supply of heating medium for effecting said bimetallic elements so as to anticipate the arrival of an additional supply of heating medium from a main source, a spherical cover surrounding said bimetallic elements and switch arms, said spherical cover having a concaved inner surface and a convexed outer surface, supporting members for affixing said cover on said base in spaced relation to said base whereby there is provided an opening surrounding said bimetallic elements for the free passage of air through said opening directly adjacent to said bimetallic elements, an annular adjustment means rotatably mounted substantially concentric with the apex of said convexed outer surface of said cover, and said annular adjustment means mechanically connected to said cam for the adjustment thereof, and indicator means provided on said cover for cooperation with said annular adjustment means so as to indicate the temperature value at which said device is set.

8. A thermostatic switch comprising in combination, a base, a pair of elongated bimetallic elements, each of said elements bent transversely at a portion intermediate the ends thereof, each of said bimetallic elements pivotally attached at one end to said base and said bimetallic elements mechanically interconnected, control means operated by the other end of one of said bimetallic elements in response to the joint temperature responsive movement of both of said elements, stop means for engaging the other end of the second of said pair of bimetallic elements, and biasing means for initially moving said bimetallic elements in such a manner as to pivot said second bimetallic element into engaging relation with said stop means.

9. A thermostatic switch comprising, in combination, a base, a pair of U-shaped bimetallic elements, each of said U-shaped bimetallic elements pivotally fastened at one end on said base, a switch mechanism operated by the other end of one of said U-shaped bimetallic elements, adjustable stop means for engaging the other end of the second of said pair of U-shaped bimetallic elements, spring means for pivoting said second U-shaped bimetallic element in such a manner as to engage said adjustable stop means, and said U-shaped bimetallic elements mechanically connected in such a manner that upon temperature change the resulting movement of said other end of said one U-shaped bimetallic element will be in an amount equal to the sum of the temperature responsive movements of each of said bimetallic elements.

10. In a condition responsive device of the class described, in combination, a round base, a pair of side by side elements connected in tandem mounted on said base, the high expansion portion of said elements being reversed with respect to each other whereby on a change in a condition the effects of the pair of elements are additive, adjusting means disposed at the center of the base between the said elements, and a curved cover for the said condition responsive device spaced from said base providing an air passage around the entire periphery of the cover through which air may flow.

11. A unitary air condition responsive device comprising, in combination, a round base, air condition responsive means mounted upon said base, control means actuated by said air condition responsive means, a circular convex shaped cover for enclosing said responsive means having its center substantially coinciding with the center of said base, the cover comprising a stationary portion and a rotatable portion having a circular periphery, the axis of rotation of said rotatable portion coinciding with the center of said cover as a whole, means for mounting said cover on said base, and means actuated by said rotatable cover portion for adjusting the value of the condition at which said air condition responsive means actuates said control means.

12. In a thermostat, in combination, a base, a resilient blade mounted at one end on said base, a contact on the other end of said blade, a cooperating contact on said base, a rigid member carried by said blade adjacent its attachment to said base, said member also normally engaging said blade at a point adjacent said contacts but adapted to be separated therefrom when said contacts are in engagement, a cam on said base, and a bimetal element having one portion engaging said cam and another portion engaging said member, said blade biasing said member to bias said bimetal element into engagement with said cam.

13. In a thermostat, in combination, a base, a resilient elongated blade fixed at one end to said base, a first movable contact on said blade remote from the point of attachment of said blade to said base, a first cooperating contact carried on said base, a rigid member secured to said blade adjacent the point of attachment of said blade to said base, said member having a portion adapted to engage said blade adjacent said first movable contact for separating said contacts, a second movable contact on said member adapted to engage a second cooperating contact carried by said base when said first pair of contacts are in engagement and said member is out of engagement with said blade, said blade being so attached to said base as normally to cause engagement of both pairs of contacts, and a bimetal element mounted on said base and adapted to engage said member to separate said movable contacts from said cooperating contacts.

BEST AVAILABLE COPY

14. In a condition responsive switch, in combination, a base, a resilient blade carried by said base, a first movable contact carried by said blade, a cooperating stationary contact carried by said base, a member mounted on said blade intermediate the point at which said blade is attached to said base and said first movable contact, a second movable contact mounted on said member, a stationary contact cooperating with said second movable contact carried by said base, a cam carried by said base, and a condition responsive element having a portion positioned by said cam and a second portion cooperable with said member for actuating said contacts.

15. In an electric switch, in combination, a base, a resilient blade carried by said base, a first movable contact carried by said blade, a cooperating stationary contact carried by said base, a member mounted on said blade intermediate the point at which said blade is attached to said base and said first movable contact, a second movable contact mounted on said member, a stationary contact cooperating with said second movable contact carried by said base, and means for moving said member.

16. In an electric switch, in combination, a base, a resilient blade carried by said base, a first movable contact carried by said blade, a cooperating stationary contact carried by said base, a member mounted on said blade intermediate the point at which said blade is attached to said base and said first movable contact, a second movable contact mounted on said member, a stationary contact cooperating with said second movable contact carried by said base, means associated with said member for limiting movement of said blade with respect thereto, and means for moving said member.

17. In an electric switch, in combination, a base, a resilient blade carried by said base, a first movable contact carried by said blade, a cooperating stationary contact carried by said base, a member mounted on said blade intermediate the point at which said blade is attached to said base and said first movable contact, a second movable contact mounted on said member, a stationary contact cooperating with said second movable contact carried by said base, means associated with said member and acting on said blade adjacent said first movable contact for limiting movement of said blade with respect to said member as said member is moved to separate said first movable contact from its cooperating stationary contact, and means for moving said member.

18. In a thermostat, in combination, a base, a resilient blade mounted at one end on said base, a contact on the other end of said blade, a cooperating contact on said base, a rigid member carried by said blade adjacent its attachment to said base, said member also normally engaging said blade at a point adjacent said contacts but adapted to be separated therefrom when said contacts are in engagement, an adjustable member on said base, and a bimetal element having one portion engaging said adjustable member and another portion engaging said rigid member, said blade biasing said rigid member to bias said bimetal element into engagement with said adjustable member.

19. In a thermostat, in combination, a base, a resilient blade mounted on said base, a rigid member pivoted and biased on said base by said blade, first and second movable contacts carried by said rigid member, one of said contacts being spring biased on said rigid member, first and second stationary contacts on said base adapted to engage said movable contacts, an adjustable member on said base, and a bimetal element having one portion engaging said adjustable member and another portion engaging said rigid member, said resilient blade biasing said bimetal element into engagement with said adjustable member.

20. In an electric switch, in combination, a base, a substantially flat resilient blade rigidly mounted at one end on said base, a movable contact on the other end of said blade, a cooperating stationary contact on said base, a rigid member carried by said blade adjacent its attachment to said base, said member also normally engaging said blade at a point adjacent said contacts but adapted to be separated therefrom when said contacts are in engagement, and an actuating element for moving said member to actuate said movable contact.

CARL G. KRONMILLER.

REFERENCES CITED

The following references are of record in the file of this patent:

UNITED STATES PATENTS

| Number | Name | Date |
|---|---|---|
| 1,942,697 | Henning | Jan. 9, 1934 |
| 2,273,671 | Ullberg | Feb. 17, 1942 |